US012605774B2

(12) United States Patent
Gill

(10) Patent No.: US 12,605,774 B2
(45) Date of Patent: Apr. 21, 2026

(54) ANNULAR HOLE CUTTER

(71) Applicant: Hougen Manufacturing, Inc., Swartz Creek, MI (US)

(72) Inventor: Jeffrey Steven Gill, Davison, MI (US)

(73) Assignee: Hougen Manufacturing, Inc., Swartz Creek, MI (US)

( * ) Notice: Subject to any disclaimer, the term of this patent is extended or adjusted under 35 U.S.C. 154(b) by 477 days.

(21) Appl. No.: 18/203,249

(22) Filed: May 30, 2023

(65) Prior Publication Data

US 2023/0390833 A1 Dec. 7, 2023

Related U.S. Application Data

(60) Provisional application No. 63/348,661, filed on Jun. 3, 2022.

(51) Int. Cl.
B23B 51/04 (2006.01)

(52) U.S. Cl.
CPC .... B23B 51/0467 (2022.01); B23B 2251/046 (2013.01); B23B 2251/406 (2013.01); B23B 2251/408 (2013.01); Y10T 408/895 (2015.01)

(58) Field of Classification Search
CPC ............... B23B 51/04; B23B 51/0467; B23B 2251/046; B23B 2251/406; B23B 2251/408; Y10T 408/895; Y10T 408/8957; Y10T 408/896; Y10S 408/703
USPC ................................. 408/204, 206, 207, 703
See application file for complete search history.

(56) References Cited

U.S. PATENT DOCUMENTS

| | | | |
|---|---|---|---|
| 4,452,554 A | 6/1984 | Hougen | |
| 4,596,499 A * | 6/1986 | Fangmann | B23B 51/04 |
| | | | 408/206 |
| 4,871,287 A | 10/1989 | Hougen | |
| 4,952,102 A * | 8/1990 | Hougen | B23B 51/04 |
| | | | 408/206 |
| 5,094,573 A | 3/1992 | Hougen | |
| 5,145,296 A | 9/1992 | Hougen | |
| 5,217,334 A * | 6/1993 | Miyazaki | B23B 51/04 |
| | | | 408/206 |
| 5,281,060 A * | 1/1994 | Strange | B23B 51/04 |
| | | | 408/206 |
| 5,944,460 A | 8/1999 | Gill | |
| 9,901,994 B2 * | 2/2018 | Gross | B23C 5/10 |
| 11,865,629 B2 * | 1/2024 | Sharivker | B23C 5/10 |
| 2005/0105981 A1 * | 5/2005 | Byrley | B23B 51/0426 |
| | | | 408/204 |

(Continued)

FOREIGN PATENT DOCUMENTS

| | | | |
|---|---|---|---|
| DE | 202015104880 U1 * | 11/2015 | B23B 51/04 |
| WO | WO-2011158378 A1 * | 12/2011 | B23B 51/04 |

*Primary Examiner* — Sunil K Singh
*Assistant Examiner* — Michael Vitale
(74) *Attorney, Agent, or Firm* — Howard & Howard Attorneys PLLC

(57) ABSTRACT

An annular hole cutter includes a cutter body having cutting teeth and a plurality of flutes extending from the cutting teeth around a side wall between a first and second end, with the flutes separated from each other by a land. The hole cutter includes side walls defining primary and secondary flutes with each one of the primary flutes defining first and second helix angles, and with each one of the secondary flutes defining a third helix angle and a fourth helix angle, with the second helix angle being greater than the first helix angle.

18 Claims, 3 Drawing Sheets

(56)                 References Cited

U.S. PATENT DOCUMENTS

2008/0181735 A1\*    7/2008   Wang ..................... B23B 51/04
                                                        76/115
2016/0158851 A1\*    6/2016   Liao ........................ B23B 51/04
                                                        408/205

\* cited by examiner

ANNULAR HOLE CUTTER

CROSS-REFERENCE TO RELATED APPLICATIONS

This application claims the benefit of U.S. Provisional Application No. 63/348,661 filed Jun. 3, 2022, and entitled "Annular Hole Cutter", the disclosure of which is herein incorporated by reference in its entirety.

TECHNICAL FIELD

The present disclosure relates to annular hole cutters and more particularly to annular hole cutters having a modified flute design that are used in conjunction with a drilling assembly to drill holes in a working surface of a workpiece.

BACKGROUND

Annular hole cutters are typically and conventionally used to drill holes in workpieces as a part of a portable or stationary drilling assembly. The annular hole cutters conventionally include a cutter body having a plurality of cutting teeth at one end and a shank at the opposing end opposite the cutting teeth. A spiral flute having a single helix angle flute design is included along the cutter body that is designed to act as an auger to remove chips and debris as the hole is created.

The subject application addresses some of the deficiencies of annular hole cutters having a single helix angle spiral flute design.

SUMMARY OF THE DISCLOSURE

An annular hole cutter for use in a drilling assembly includes a cutter body having cutting teeth and a plurality of flutes extending from the cutting teeth around a side wall between a first and second end, with the flutes separated from each other by a land. The hole cutter includes side walls defining primary and secondary flutes with each one of the primary flutes defining first and second helix angles and with each one of the secondary flutes defining a third helix angle and a fourth helix angle, with the second helix angle being greater than the first helix angle.

In particular, the annular hole cutter for cutting holes in a workpiece includes a cutter body having a cylindrical side wall defining an outer periphery with the cutter body extending a length between a first end and a second end, the cutter body including a plurality of cutting teeth spaced circumferentially around the second end, with a centerline extending through a center of the cutter body parallel to the length. The annular hole cutter also includes a plurality of flutes extending from the plurality of cutting teeth around the cylindrical side wall between the first end and the second end, each of the plurality of flutes comprising a flute bottom, a circumferentially leading side wall extending transverse from the flute bottom to define a primary flute, and a circumferentially trailing side wall extending transverse from the flute bottom and spaced from the circumferentially leading side wall to define a secondary flute, the circumferentially leading side wall and the circumferentially trailing side wall of the plurality of flutes each including a cutting flute portion adjacent to the second end and an auger flute portion extending from the cutting flute portion and adjacent to the first end. The annular hole cutter also includes a plurality of lands, with a respective one land of the plurality of lands separating each respective adjacent pair of the plurality of flutes at the outer periphery.

The cutting flute portion of the circumferentially leading side wall of each of the plurality of flutes defines a first straight line which extends along a length of the circumferentially leading side wall, and the auger flute portion of the circumferentially leading side wall of each of the plurality of flutes defines a second straight line which extends along a length of the circumferentially leading side wall. A first helix angle is defined between the centerline of the cutter body and the first straight line, and a second helix angle is defined between the centerline of the cutter body and the second straight line, wherein the second helix angle is greater than the first helix angle.

In certain embodiments, the cutting flute portion of the circumferentially trailing side wall of each of the plurality of flutes defines a third straight line which extends along a length of circumferentially trailing side wall of the cutting flute portion, and the auger flute portion of the circumferentially trailing side wall of each of the plurality of flutes defines a fourth straight line which extends along a length of the circumferentially trailing side wall of the auger flute portion. A third helix angle is defined between the centerline of the cutter body and the third straight line, and a fourth helix angle is defined between the centerline of the cutter body and the fourth straight line. In these embodiments, wherein the fourth helix angle is greater than the third helix angle.

In certain embodiments, the fourth helix angle is also greater than the third helix angle, the first helix angle is greater than the third helix angle and less than the fourth helix angle, and the second helix angle is greater than each of the fourth helix angle and the third helix angle.

In certain embodiments, the fourth helix angle is also greater than the third helix angle, the first helix angle is equal to the third helix angle and the second helix angle is greater than the fourth helix angle.

In certain embodiments, the fourth helix angle is also greater than the third helix angle and the second helix angle is greater than the fourth helix angle.

In certain embodiments, the fourth helix angle is also greater than the third helix angle, the second helix angle is greater than the fourth helix angle, and the first helix angle is equal to the third helix angle.

In these embodiments, the first and third helix angles may be between 15 and 30 degrees, while the second and fourth helix angles may be between 35 and 55 degrees.

In these embodiments, the annular cutter also includes a shank extending from the first end, and in certain of these embodiments the shank is hollow and defines an internal spliced surface configured for receipt of a splined shaft of the drilling assembly.

In certain embodiments, a distance defined between said cutting flute portion of said circumferentially leading side wall and said cutting flute portion of said circumferentially trailing side wall widens in a direction away from said second end and towards said first end, and/or a distance defined between said auger flute portion of said circumferentially leading side wall and said auger flute portion of said circumferentially trailing side wall widens in a direction away from said second end and towards said first end.

Other objects, features and advantages of the subject application will be readily appreciated, as the same becomes better understood after reading the subsequent description taken in connection with the accompanying drawings.

BRIEF DESCRIPTION OF THE DRAWINGS

Other advantages of the subject application will be readily appreciated, as the same becomes better understood by reference to the following detailed description when considered in connection with the accompanying drawings.

DETAILED DESCRIPTION

Figures 1, 2A, 2B:
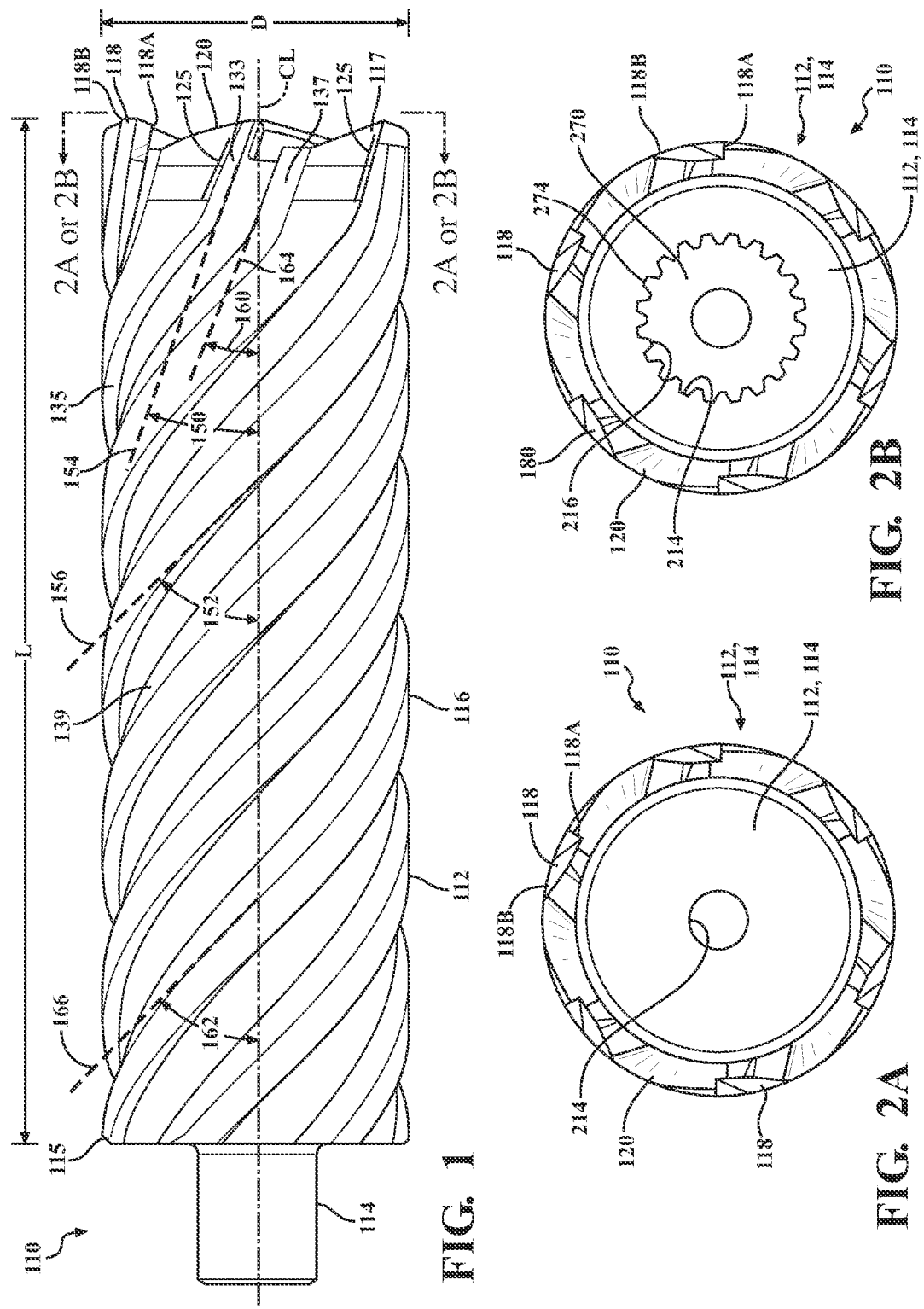
FIG. 1 is a side view of the annular hole cutter of the present disclosure.
FIG. 2A is an end view of FIG. 1 shown by arrow 2A-2A according to one embodiments of the present disclosure.
FIG. 2B is an end view of FIG. 1 shown by arrow 2B-2B according to an alternative embodiment of the present disclosure.

Referring now to FIGS. 1-5, wherein like numerals indicate corresponding parts throughout the several views, an annular hole cutter for use with a drilling assembly, such as a portable drilling assembly or a stationary drilling assembly, is shown generally as 110 and is described hereinafter alternatively as an annular hole cutter 110, a hole cutter 110 or simply as a cutter 110.

The cutter 110 includes a cutter body 112, or body 112, and a shank 114. In certain embodiments, the cutter 110 is made of steel such as M-42 high speed steel, while in other embodiments the cutter 110 may be made of carbide steel or some other type of hard metal or metal alloy suitable for drilling. The cutter body 112 has a generally inverted cup shape having a side wall 116 the length L of which is greater than the thickness of the workpiece into which the hole is to be cut. In addition, the cutter body 112 defined by the outer periphery of the side walls 116 has a cross-sectional diameter D that corresponds to the diameter of the hole to be cut in the workpiece. In addition, the cutter body 112 extends between a first end 115 (i.e., upper end 115) and a second end 117 (i.e., a lower end 117) with a length therebetween. Still further, the shank 114 extends from the first end 115 of the cutter body 112 in a direction opposite the second end 117.

The cutter body 112 is preferably cylindrical in shape as defined by its outer periphery, and the length of the cutter body 112 defines a rotational axis defined as centerline CL (see FIG. 1) that runs through the center of the cutter body 112.

While the drawings illustrate the annular hole cutter 110 having particular dimensions in terms of body length and body cross-sectional diameter as defined above, such dimensions should not be construed as limiting. Various other lengths and cross-sectional diameters of the cutter body 112 of the annular hole cutters 110 are contemplated.

The lower end 117 of side wall 116, opposite the upper end 115 from which the shank 114 extends, has a plurality of circumferentially spaced cutting teeth 118 (i.e., teeth 118 or the singular tooth 118). More in particular, the cutter body 112 includes the plurality of cutting teeth 118 spaced circumferentially around the second end 117 with the centerline CL extending through a center of the cutter body 112 parallel to the length. A spiral flute 122 (i.e., a flute 122) extends upwardly around the outer periphery of the cutter 110 adjacent each tooth 118. The successive flutes 122 (i.e., a plurality of flutes 122) are separated by a land 124 at the outer periphery of the cutter 110 (i.e., there are successive lands 124 which may otherwise be referred to as a plurality of lands 124, and thus a respective one land of said plurality of lands 124 separates each respective adjacent pair of said plurality of flutes 122 at the outer periphery). The leading edge of each land 124 is formed with a narrow margin. In certain embodiments, this narrow margin of the leading edge of the land 124 is approximately twenty thousandths of an inch (0.020") to about thirty thousandths of an inch (0.030"). The portions of the annular side wall 116 of the cutter 110 between the successive teeth 118 define webs 126. A radially outer face 128 of each web 126 defines the radially inner wall of each flute 122. The depth of the flute 122 is approximately equal to or slightly greater than the thickness of its respective web 126.

Each flute 122 includes a flute bottom 131 that further defines the depth of the flute 122, a circumferentially leading side wall 130 extending transverse to the flute bottom 131 and terminating into the land 124, and a circumferentially trailing side wall 132 extending transverse from the flute bottom 131 and spaced from the circumferentially leading side wall 132 and terminating into the next adjacent land 124. The flute bottom 131, in certain embodiments, corresponds to the radially outer face 128 of each web 126 and the radially inner wall of each flute 122.

Each flute 122 is divided into two portions along their respective length from the first end 115 to the second end 117, with the first portion of each flute 122 adjacent to the lower end 117 defined as a cutting flute portion 123 (see FIG. 5) of the flute 122 (i.e., a cutting flute 123), and with the second portion of each flute 122 extending from the respective cutting flute 123 in a direction toward the shank 114 and away from the lower end 117 along the body 112 defined as an auger flute portion 125 (see FIG. 5) of the flute 122 (i.e., an auger flute 125).

In addition, the circumferentially leading side wall 130 of each of the flutes 122 may also be further defined as primary flutes 127, while the circumferentially trailing side wall 132 of each of the flutes 122 may be defined as secondary flutes 129.

The cutting flute portion 123 of each of the primary flutes 127 may be further defined as a cutting side portion 133, while the auger flute portion 125 of each of the primary flutes may be further defined as an augering side portion 135. Similarly, the cutting flute portion 123 of each of the secondary flutes 129 may be further defined as a non-cutting side portion 137 (i.e., the back side cutting portion 137), while the auger flute portion 125 of each of the secondary flutes 129 may be further defined as a non-augering side portion 139 (i.e., the back side augering portion 139). The primary flutes 127 and secondary flutes 129 are alternately arranged so that each primary flute 127 is disposed circumferentially about the side walls 116 between successive secondary flutes 129.

Figures 3, 4:
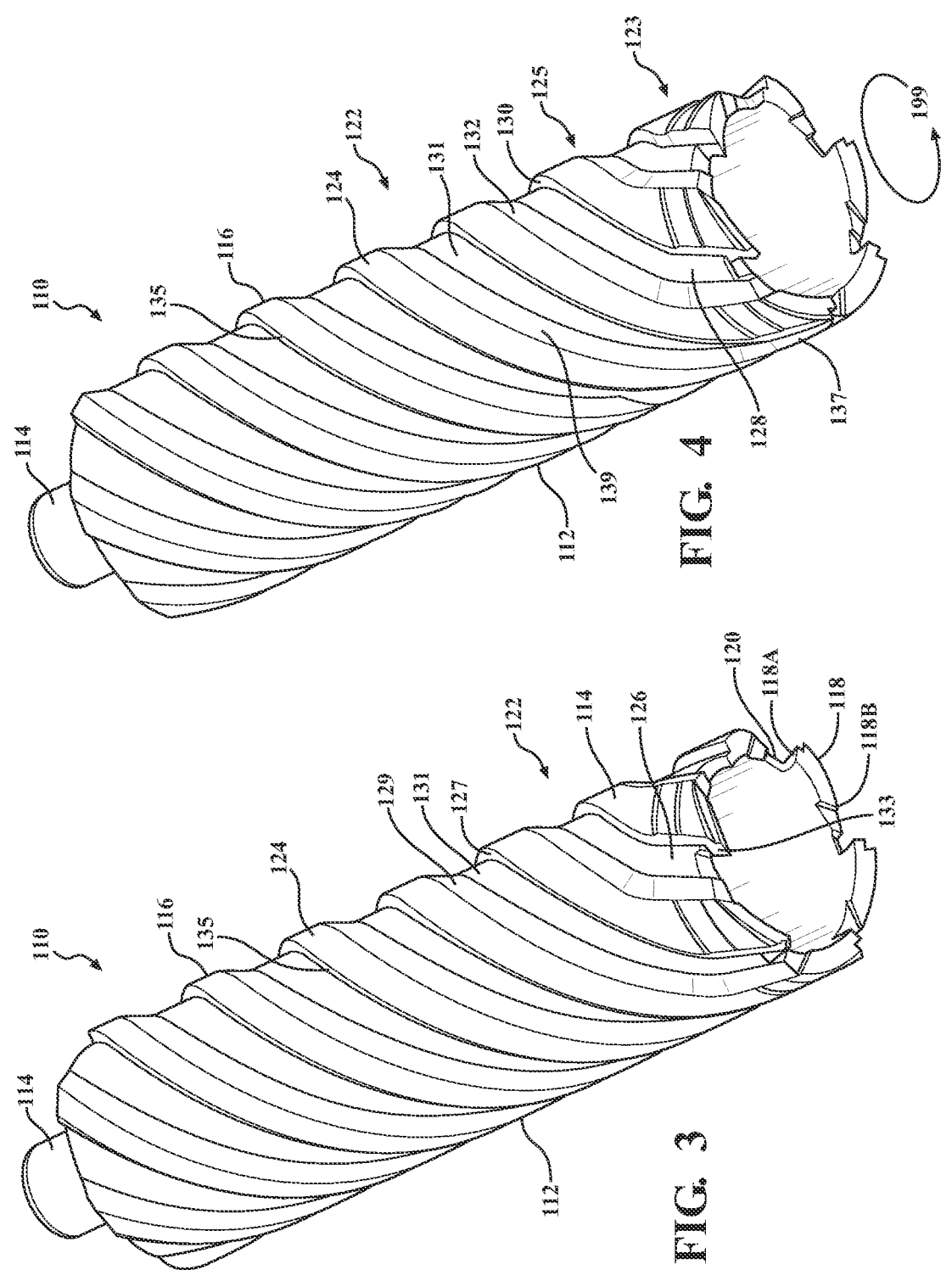
FIG. 3 is a perspective view of the annular hole cutter of FIG. 1.
FIG. 4 is another perspective view of the annular hole cutter of FIG. 3 rotated approximately 30 degrees in a counterclockwise direction.

The cutting side portion 133 and augering side portion 135 of the primary flute 127 of the respective flute 122 are determined based on the direction of rotation of the annular hole cutter 110 during a drilling/cutting operation (which is illustrated in the counterclockwise direction as shown in FIG. 4 by arrow 199) and are associated with and extend from the cutting side 118A of the cutting teeth 118, while the non-cutting side portion 137 and non-augering side portion 139 of the secondary flute 129 are associated with and extend from the non-cutting side 118B, or heel 118B of the cutting teeth 118. The cutting side 118A of the cutting teeth 118 terminates radially inward into a gullet 120 that is disposed between each respective pair of cutting teeth 118.

More in particular, the primary flutes 127 are further defined as the cutting side portion 133 and augering side portion 135 of the circumferentially leading side wall 130 of each flute 122, while the secondary flutes 129 may be further defined as the non-cutting side portion 137 and non-augering side portion 139 of the circumferentially trailing side wall 132 of each flute 122. As illustrated in FIGS. 1, 3, and 4, each of the primary flutes 127 and secondary flutes 129 extends between the first end 115 and second end 117 of the cutter body 112.

There are many factors that impact the performance of an annular hole cutter, including the annular hole cutter 110 described herein, included in a drilling assembly during a drilling operation. Often the helix angle contained along each of the flutes is overlooked or is only considered in the context of a single helix angle flute design. The helix angle controls the angle of the cutting edge (i.e., along the circumferentially leading side wall of each of the flutes, such as the circumferentially leading side wall 130 of each of the flutes 122 as described herein) entering the workpiece as the annular hole cutter rotates and is measured by the angle formed between a centerline of the annular hole cutter and a straight line tangent of an edge of the circumferentially leading side wall of the spiral flute. In general, the larger the helix angle, the more gradual the entry of the cutting flute into the hole. This creates a smoother transition as the cutting flute reaches the desired axial depth of cut. The advantages of higher helix angles (such as 45 degrees or higher) having a single helix angle design is that there is more efficient chip evacuation through the flute due to an increased vertical force, reduced tool pressure, better hole finishes, and less heat buildup during use. In contrast, lower helix angle annular cutters (i.e., annular hole cutters having a single lower helix angle design) provide their own advantages, in that they generally allow greater material removal and larger chip removal than higher helix angle annular cutters, but typically provide a rougher finish to the holes and use a lower feed rate due to the increased radial force required. In single angle helix flute designs, both the circumferentially leading side wall and the circumferentially trailing side wall is the same along each of the flutes and extends along the length of the flutes from the first to second ends. The subject disclosure provides for improvements to an annular hole cutter 110 by providing at least two helix angles along each of the circumferentially leading side wall 130 and the circumferentially trailing side wall 132, which provides advantages both in terms of drilling the holes in the workpiece and evacuating the shavings creating during the drilling process, as described further below.

Referring back to FIGS. 1, 3 and 4, each of the primary flutes 127 defines a first helix angle 150 and a second helix angle 152, while each of the secondary flutes 129 defines a third helix angle 160 and a fourth helix angle 162.

In particular, the cutting flute portion 123 of the circumferentially leading side wall 130 of each of the plurality of flutes 122 defines a first straight line 154 (see FIG. 1) which extends along a length of the circumferentially leading side wall 130, and the auger flute portion 125 of the circumferentially leading side wall 130 of each of the plurality of flutes 122 defines a second straight line 156 (see FIG. 1) which extends along a length of the circumferentially leading side wall 130. The first helix angle 150 is defined between the centerline CL of the cutter body 112 and the first straight line 154, and the second helix angle 152 is defined between the centerline CL of the cutter body 112 and the second straight line 156.

In addition, the cutting flute portion 123 of the circumferentially trailing side wall 132 of each of the plurality of flutes 122 defines a third straight line 164 which extends along a length of circumferentially trailing side wall 132 of the cutting flute portion 123, and the auger flute portion 125 of the circumferentially trailing side wall 132 of each of the plurality of flutes 122 defines a fourth straight line 166 which extends along a length of the circumferentially trailing side wall 132 of the auger flute portion 125.

As such, the first helix angle 150 is defined between the centerline CL of the cutter body 112 and the first straight line 154, and the second helix angle 152 is defined between the centerline CL of the cutter body 112 and the second straight line 156. Similarly, the third helix angle 160 is defined between the centerline CL of the cutter body 112 and the third straight line 164, and the fourth helix angle 162 is defined between the centerline CL of the cutter body 112 and the fourth straight line 166.

In certain embodiments, such as shown in FIGS. 1, 3 and 4, the first helix angle 150 is less than the second helix angle 152 (i.e., the second helix angle 152 is greater than the first helix angle 150).

In certain other embodiments, as also shown in FIGS. 1, 3 and 4, the third helix angle 160 is less than the fourth helix angle 162 (i.e., the fourth helix angle 162 is greater than the third helix angle 160).

In still further embodiments, and as also shown in FIGS. 1, 3 and 4, the first helix angle 150 is less than the second helix angle 152 and the third helix angle 160 is less than the fourth helix angle 162.

In even still further embodiments, the first helix angle 150 is equal to the third helix angle 160, while in other embodiments (not shown) the first helix angle 150 is greater than the third helix angle 160.

In even still further embodiments, the first helix angle 150 is equal to the third helix angle 160 and the fourth helix angle 162 is less than the second helix angle 152.

In certain embodiments, in addition to the second helix angle 152 being greater than the first helix angle 150, the fourth helix angle 162 is also greater than the third helix angle 160, the first helix angle 150 is greater than the third helix angle 160 and less than the fourth helix angle 162, and the second helix angle 152 is greater than each of the fourth helix angle 162 and the third helix angle 160.

In certain embodiments, in addition to the second helix angle 152 being greater than the first helix angle 150, the fourth helix angle 162 is also greater than the third helix angle 160, the first helix angle 150 is equal to the third helix angle 160, and the second helix angle 152 is greater than the fourth helix angle 162.

In certain embodiments, in addition to the second helix angle 152 being greater than the first helix angle 150, the fourth helix angle 162 is also greater than the third helix angle 160, and the second helix angle 152 is greater than the fourth helix angle 162.

In certain embodiments (not shown), in addition to the second helix angle 152 being greater than the first helix angle 150, the fourth helix angle 162 is also greater than the third helix angle 160, the second helix angle 152 is greater than the fourth helix angle 162, and the first helix angle 150 is equal to the third helix angle 160.

In any of the embodiments described above in which the first helix angle 150 is greater than the third helix angle 160, in certain further embodiments, the difference in angular measurement between the first helix angle 150 and the third helix angle 160 is between 0.1 and degrees, such as from 0.5 and 5 degrees, such as from 1 to 5 degrees.

In certain embodiments, the first helix angle 150 and the third helix angle 160 may each independently vary between 15 and 30 degrees, such as between 18 and 28 degrees, such as from 22 and 26 degrees, such as 23 degrees, or 24 degrees, or 25 degrees.

In certain embodiments, the second helix angle 152 and the fourth helix angle 162 may each independently vary between 35 and 55 degrees, such as from 40 and 50 degrees, such as from 42 and 48 degrees, 44 degrees, 45 degrees, or 46 degrees.

In one particular embodiment, in which the cutter body 112 is formed from steel, the first and third helix angles 150, 160 are 25 degrees, while the second and fourth helix angles 152, 162 are 45 degrees.

In another particular embodiment, in which the cutter body 112 is formed from steel, the first helix angle 150 is 25 degrees, while the second helix angle 152 is 45 degrees.

In certain embodiments, wherein the cutter body 112 is formed of steel such as M-42 high speed steel, the first helix angle 150 and the third helix angle 160 may each independently vary between 25 and 30 degrees. In certain other embodiments, wherein the cutter body 112 is formed of carbide (i.e., carbon mixed with another hard metal such as titanium, vanadium or tungsten, which may also encompass certain steels classified as carbide steel), the first helix angle 150 and the third helix angle 160 may each independently vary between 15 and 20 degrees.

Figure 5:
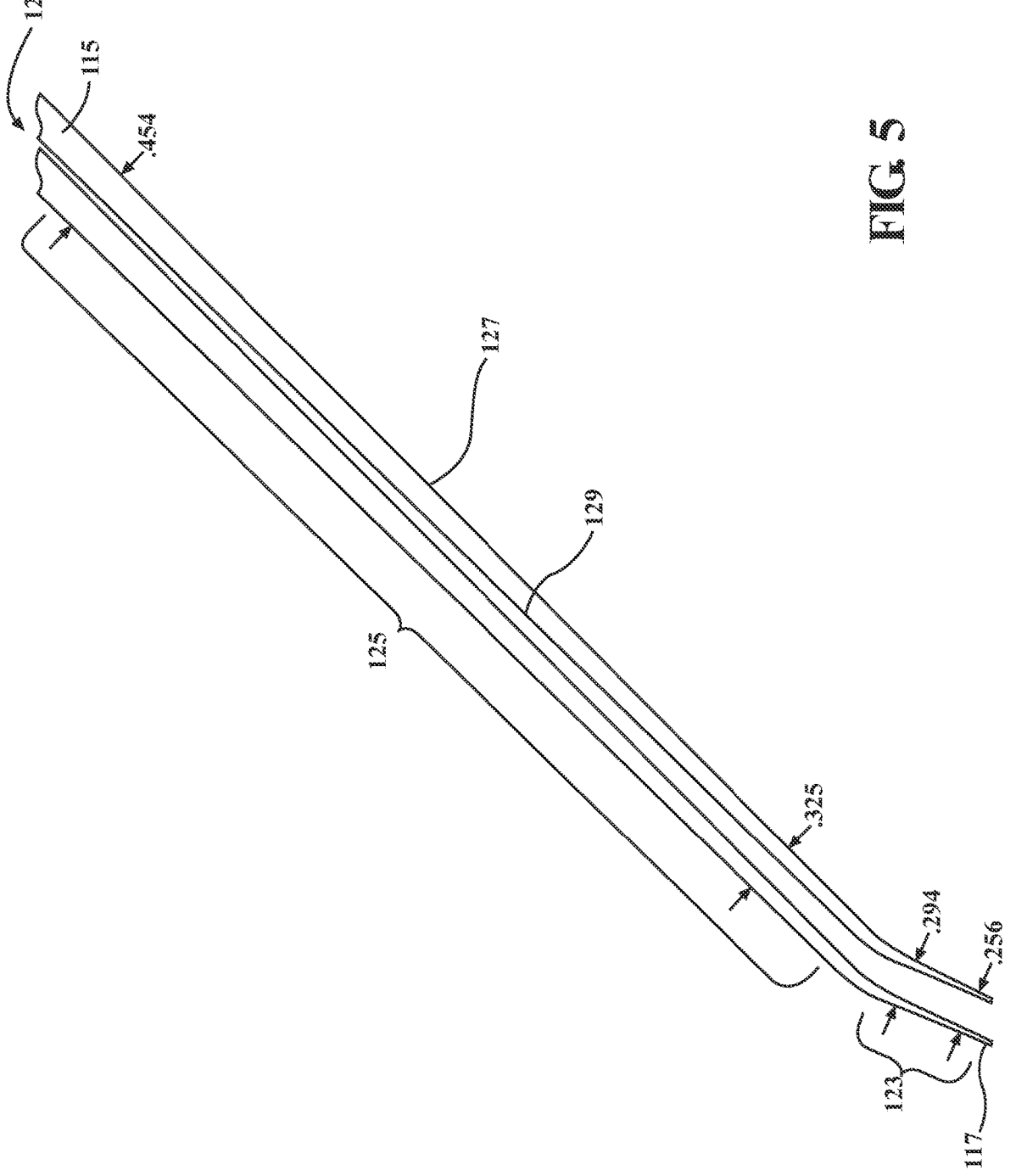
FIG. 5 is a two-dimensional view of the primary flute and secondary flute of one representative flute of FIG. 1 unrolled to illustrate the varying thickness along the primary flute and secondary flute.

In each of the embodiments above, and as best illustrated in FIG. 5, the distance widens between the circumferentially leading side wall 130 and the circumferentially trailing side wall 132 of a particular flute 122 in a direction away from the second end 117 toward the first end 115 along the cutting flute 123 (i.e., wherein a distance defined between the circumferentially leading side wall 130 and the circumferentially trailing side wall 132 of a particular flute 122 widens in a direction away from the second end 117 and toward the first end 115).

Relatedly, in certain embodiments, a distance defined between the cutting flute portion 123 of the circumferentially leading side wall 130 and the cutting flute portion 123 of the circumferentially trailing side wall 132 widens in a direction away from the second end 117 and towards the first end 115, and/or a distance defined between the auger flute portion 125 of the circumferentially leading side wall 130 and the auger flute portion 125 of the circumferentially trailing side wall 132 widens in a direction away from the second end 117 and towards the first end 115.

For example, as illustrated in one representative embodiment shown in FIG. 5, in which each of first, second, third and fourth helix angles 150, 152, 160 and 162 are included and different from each other (with the first helix angle 150 at 25 degrees, the second helix angle 152 at 45 degrees, the third helix angle 160 at 23 degrees, and the fourth helix angle 162 at 44 degrees in FIG. 5, although not illustrated thereon), a representative flute 122 is illustrated in which the distance between the circumferentially leading side wall 130 and the circumferentially trailing side wall 132 of a particular flute 122 widens from 0.256 units to 0.294 units along the cutting flute 123 (the units 0.256 and 0.294 are each illustrated on FIG. 5) in a direction away from the second end 117, and then further widens from 0.325 units to 0.454 units along the auger flute 125 (the units 0.325 and 0.454 are each illustrated on FIG. 5) moving in a direction toward the first end 115 (as used herein, the term "units" refers to any unit of measure such as inches or millimeters). This widening from the second end 117 to the first end 115 functions like a reverse funnel that pulls shavings from the workpiece (i.e., the piece being drilled by a drilling assembly including the annular hole cutter 110) away from the second end 117 (i.e., the cutting end) of the annular hole cutter 110 and toward the first end 115, assuring that the shavings are flowing to an area of more space within the respective flute 122 and out of the hole. As such, the drilling of deep holes in a workpiece becomes more reliable and problem free as compared to annular hole cutters having a single helix angle design.

In the particular embodiment described above, where the first and third helix angles 150, 160 are 25 degrees and the second and fourth helix angles 152, 162 are 45 degrees, significant enhancements were observed when drilling holes 6 inches deep in a metal workpiece in terms of chip evacuation and shavings flowing from the cutting/second end 117 toward the first end 115 and providing a hole in the work piece with an overall acceptable finish, with the drilling assembly to which the annular hole cutter 110 was mounted performing without observed issues.

In the other particular embodiment described above where the first helix angle 150 is 25 degrees and the second helix angle 152 is 45 degrees, significant enhancements were observed when drilling holes 5 inches deep in a metal workpiece in terms of chip evacuation and shavings flowing from the cutting/second end 117 toward the first end 115 and providing a hole with an overall acceptable finish, with the drilling assembly to which the annular hole cutter 110 was mounted performing without observed issues.

Referring to FIGS. 2A and 2B, two alternative versions end of the annular hole cutter 110 are provided.

In the first embodiment, as shown in FIG. 2A, the shank 114 and the cutter body 112 are each in the form of a hollow cylinder in which the internal surface 214 is generally circular and smooth. In this embodiment, the shank 114 is generally configured to be coupled to the drill portion of the drilling assembly along its outer surface in a method well known in the art, and hence the rotation of the drill to which the annular hole cutter 110 is attached engages the outer surface of the annular hole cutter 110 to rotate the annular hole cutter 110 to drill the hole in the workpiece.

In an alternative embodiment as shown in FIG. 2A, the internal surface 214 of the shank 114 and optionally of the cutter body 112 includes splined regions 216 that extend internally along its length toward the first end 115 that are sized and shaped to accept the series of splines 274 of a splined shaft 270, with the splined shaft 270 configured to be coupled to a gear assembly of the portable or stationary drill (not shown). In this embodiment, the rotation of the gears of the drill rotates the splined shaft 270, with the splines 274 of the splined shaft 270 engaging the splined regions 216 of the internal surface 214 of the shank 114 to rotate the annular hole cutter 110 to drill the hole in the workpiece.

While the disclosure has been described with reference to the examples above, it will be understood by those skilled in the art that various changes may be made, and equivalents may be substituted for elements thereof, without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all examples falling within the scope of the appended claims.

What is claimed is:

1. An annular hole cutter for cutting holes in a workpiece, said annular cutter comprising:

a cutter body having a cylindrical side wall defining an outer periphery with said cutter body extending a length from a first end to a second end, said cutter body including a plurality of cutting teeth spaced circumferentially around said second end, with a centerline extending through a center of said cutter body parallel to said length of said cutter body;

a plurality of flutes extending from said plurality of cutting teeth around said cylindrical side wall between said first end and said second end, each of said plurality of flutes comprising a respective flute bottom, a respective circumferentially leading side wall extending transverse from said flute bottom, and a respective circumferentially trailing side wall extending transverse from said flute bottom and spaced from said circumferentially leading side wall, said circumferentially leading side wall and said circumferentially trailing side wall of said plurality of flutes each including a respective cutting flute portion adjacent to said second end and a respective auger flute portion extending from said cutting flute portion and adjacent to said first end; and a plurality of lands, with a respective one land of said plurality of lands separating each respective adjacent pair of said plurality of flutes at said outer periphery;

wherein said cutting flute portion of said circumferentially leading side wall of each of said plurality of flutes defines a first straight line which extends perpendicular to a height of said circumferentially leading side wall and along a first length of said circumferentially leading side wall, and wherein said auger flute portion of said circumferentially leading side wall of each of said plurality of flutes defines a second straight line which extends perpendicular to said height of said circumferentially leading side wall and along a second length of said circumferentially leading side wall, wherein a first helix angle is defined between said first straight line and a line extending parallel to said centerline of said cutter body on said cylindrical side wall, and wherein a second helix angle is defined between said second straight line and said line extending parallel to said centerline of said cutter body on said cylindrical side wall, and wherein said second helix angle is greater than said first helix angle.

2. The annular hole cutter of claim 1, wherein said cutting flute portion of said circumferentially trailing side wall of each of said plurality of flutes defines a third straight line which extends perpendicular to a height of said circumferentially trailing side wall and along a third length of circumferentially trailing side wall of said cutting flute portion, and wherein said auger flute portion of said circumferentially trailing side wall of each of said plurality of flutes defines a fourth straight line which extends perpendicular to said height of said circumferentially trailing side wall and along a fourth length of said circumferentially trailing side wall of said auger flute portion, wherein a third helix angle is defined between said third straight line and a line extending parallel to said centerline of said cutter body on said cylindrical side wall, and wherein a fourth helix angle is defined between said fourth straight line and said line extending parallel to said centerline of said cutter body on said cylindrical side wall, and wherein said fourth helix angle is greater than said third helix angle.

3. The annular hole cutter of claim 2, wherein said first helix angle is greater than said third helix angle and less than said fourth helix angle, and wherein said second helix angle is greater than each of said fourth helix angle and said third helix angle.

4. The annular hole cutter of claim 2, wherein said first helix angle is equal to said third helix angle, and wherein said second helix angle is greater than said fourth helix angle.

5. The annular hole cutter of claim 2, wherein said second helix angle is greater than said fourth helix angle.

6. The annular hole cutter of claim 5, wherein said first helix angle is equal to said third helix angle.

7. The annular hole cutter of claim 2, wherein said third helix angle is between 15 and 30 degrees.

8. The annular hole cutter of claim 7, wherein said fourth helix angle is between 35 and 55 degrees.

9. The annular hole cutter of claim 2, wherein said fourth helix angle is between 35 and 55 degrees.

10. The annular hole cutter of claim 1, wherein said first helix angle is between 15 and 30 degrees.

11. The annular hole cutter of claim 10, wherein said second helix angle is between 35 and 55 degrees.

12. The annular hole cutter of claim 1, wherein said second helix angle is between 35 and 55 degrees.

13. The annular hole cutter of claim 1 further comprising a shank extending from said first end of said cutter body.

14. The annular hole cutter of claim 13, wherein said shank is hollow and defines an internal splined surface configured for receipt of a splined shaft of a drilling assembly.

15. The annular hole cutter of claim 1, wherein a distance defined between said circumferentially leading side wall and said circumferentially trailing side wall of a flute of said plurality of flutes widens in a direction away from said second end and toward said first end.

16. The annular hole cutter of claim 1, wherein a distance defined between said cutting flute portion of said circumferentially leading side wall and said cutting flute portion of said circumferentially trailing side wall widens in a direction away from said second end and towards said first end.

17. The annular hole cutter of claim 1, wherein a distance defined between said auger flute portion of said circumferentially leading side wall and said auger flute portion of said circumferentially trailing side wall widens in a direction away from said second end and towards said first end.

18. The annular hole cutter of claim 1, wherein a distance defined between said cutting flute portion of said circumferentially leading side wall and said cutting flute portion of said circumferentially trailing side wall widens in a direction away from said second end and towards said first end, and wherein a distance defined between said auger flute portion of said circumferentially leading side wall and said auger flute portion of said circumferentially trailing side wall widens in a direction away from said second end and towards said first end.

* * * * *